US009138113B2

(12) United States Patent
Nesom et al.

(10) Patent No.: US 9,138,113 B2
(45) Date of Patent: Sep. 22, 2015

(54) BLOWER/VACUUM DEVICE

(71) Applicant: Techtronic Outdoor Products Technology Limited, Hamilton (BM)

(72) Inventors: Floyd Jeffrey Nesom, Dongguan (CN); Peng Chen, Chengdu (CN)

(73) Assignee: Techtronic Outdoor Products Technology Limited, Hamilton (BM)

( * ) Notice: Subject to any disclaimer, the term of this patent is extended or adjusted under 35 U.S.C. 154(b) by 0 days.

(21) Appl. No.: 14/276,010

(22) Filed: May 13, 2014

(65) Prior Publication Data

US 2014/0331444 A1 Nov. 13, 2014

(51) Int. Cl.
*A47L 5/14* (2006.01)
*A01G 1/12* (2006.01)

(52) U.S. Cl.
CPC .. *A47L 5/14* (2013.01); *A01G 1/125* (2013.01)

(58) Field of Classification Search
CPC ............. A47L 5/14; A47L 5/24; A47L 5/225; A47L 9/1427; A47L 9/2889; A01G 1/125
See application file for complete search history.

(56) References Cited

U.S. PATENT DOCUMENTS

| | | | | |
|---|---|---|---|---|
| 3,494,528 | A * | 2/1970 | Suzuki Michio et al. | 226/90 |
| 4,644,606 | A * | 2/1987 | Luerken et al. | 15/330 |
| 5,535,479 | A * | 7/1996 | Pink et al. | 15/410 |
| 5,604,954 | A * | 2/1997 | Webster et al. | 15/330 |
| 5,979,013 | A * | 11/1999 | Beckey et al. | 15/326 |
| 6,000,096 | A * | 12/1999 | Everts et al. | 15/330 |
| 2008/0127448 | A1* | 6/2008 | Kremsler et al. | 15/330 |
| 2008/0295274 | A1* | 12/2008 | Osterchill et al. | 15/300.1 |
| 2009/0241285 | A1* | 10/2009 | Hinklin et al. | 15/330 |
| 2010/0266397 | A1* | 10/2010 | Allen et al. | 415/208.1 |
| 2012/0138717 | A1* | 6/2012 | Svoboda et al. | 241/56 |
| 2012/0216367 | A1* | 8/2012 | Takano et al. | 15/344 |
| 2013/0185892 | A1* | 7/2013 | Walker | 15/330 |

* cited by examiner

*Primary Examiner* — Dung Van Nguyen
(74) *Attorney, Agent, or Firm* — Michael Best & Friedrich LLP

(57) ABSTRACT

A hand held blower/vacuum device includes an impeller mounted in a scroll housing and a handle by which the device may be suspended and which is rotatably mounted to turn between vacuum and blower positions. In both of the blower and vacuum positions a longitudinal axis of the grip generally lies in an upright plane that passes through a center of gravity of the device, and the grip is disposed above the center of gravity, such that the device hangs below the grip in different balanced orientations in the blower and vacuum positions.

13 Claims, 6 Drawing Sheets

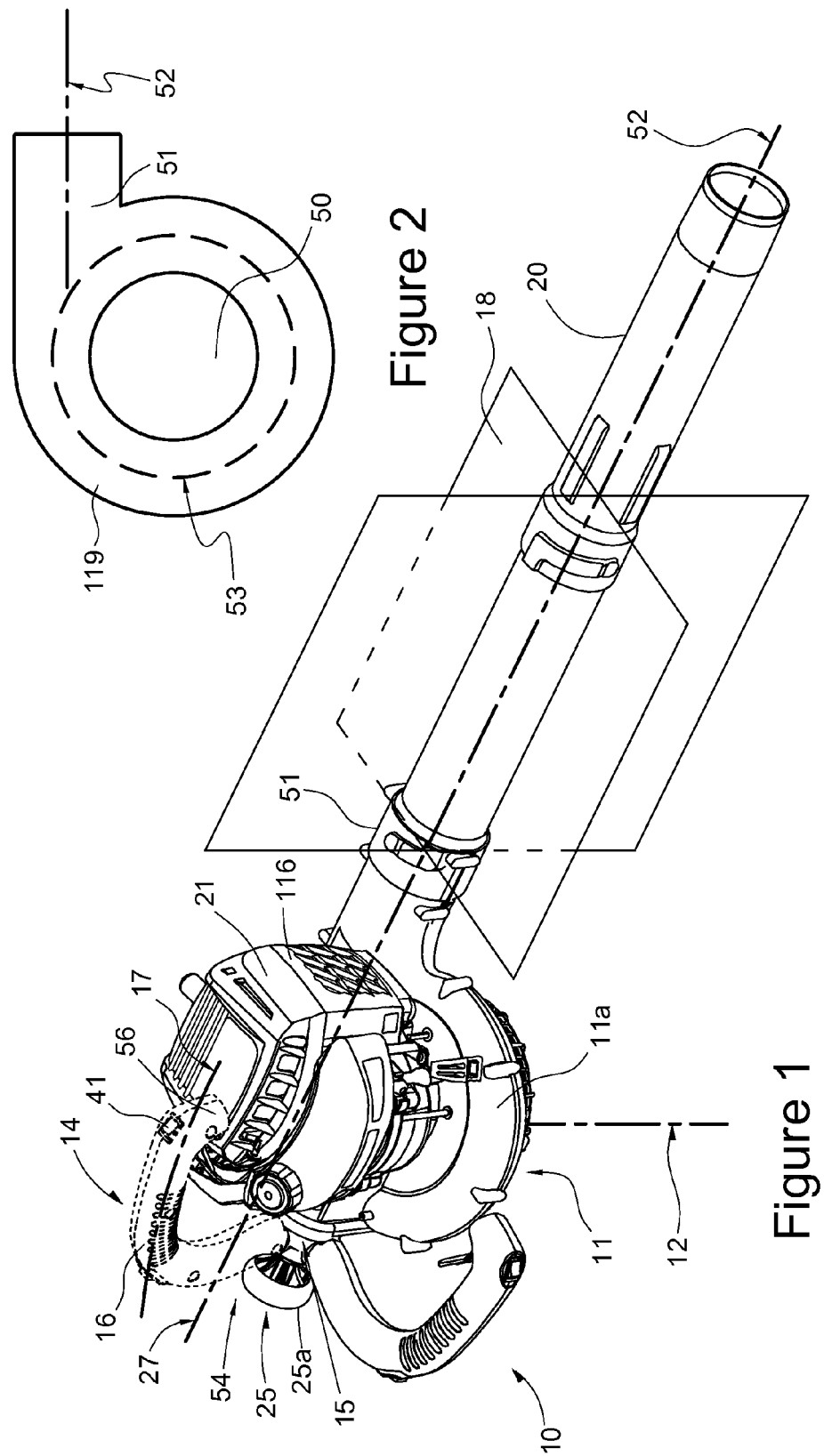

BLOWER/VACUUM DEVICE

RELATED APPLICATION DATA

This application claims priority under 35 U.S.C. §119(a) to PCT/CN2013/075563 filed May 13, 2013, the entire contents of which are incorporated herein by reference.

BACKGROUND

The present invention relates to blower-vacuum devices, commonly referred to as blowervacs, which are typically used for collecting garden waste, such as leaves, grass cuttings and twigs.

Blowervacs have both vacuum and blower modes of operation and generally comprise a motor having an output shaft connected to an impeller. The impeller is enclosed within a volute or scroll housing and is configured to draw air in along its axis of rotation through an inlet and expel air out tangentially from an outlet when the impeller is driven by the motor. In the blowing mode of operation, clean air is drawn axially into the scroll housing from the atmosphere and a blower tube is attached to the outlet in order to concentrate and direct the expelled air into a jet. In the vacuuming mode, waste is most commonly drawn in through the inlet via a vacuum tube, and an air-porous receptable is attached directly to the outlet from the scroll housing, so that the impeller comminutes the waste.

U.S. Pat. No. 4,644,606 describes a blowervac with a main handle integral with the impeller housing and comprising first and sections acutely inclined to one another, the first section having an axis generally parallel to the axis of the air outlet. When the first section of the handle is gripped by an operator the device will be in the vacuum mode with the air outlet in a generally horizontal position. When the second section of the handle is gripped, the device will be in the blower mode with the air outlet facing ahead of the operator at a downward angle. Owing to this arrangement, for satisfactory ergonomic performance, particularly when raising and lowering the vacuum tube in use, a secondary handle must also be provided to allow the user to apply the requisite torque to the device. Thus, while single-handed blowing operation is possible, but both hands are required for a vacuum operation. It is an object of the present invention to overcome or substantially ameliorate the above disadvantages or, more generally, to provide an improved blower/vacuum device.

SUMMARY

According to one aspect of the present invention there is provided a hand held blower/vacuum device comprising:
   an impeller having an impeller axis;
   a motor for rotating the impeller;
   a body for supporting the motor and impeller, the body including a scroll housing for enclosing the impeller;
   an air inlet in the scroll housing that is aligned axially;
   an air outlet in the scroll housing, and
   a handle having an elongate grip, the handle being rotatably connected to the body to turn between at least two positions, a blower position for operation in a blower mode in which the air inlet is generally horizontal and the air outlet is generally inclined at a downward angle, and a vacuum position for operation in a vacuum mode in which the air inlet is generally inclined at a downward angle, wherein in both of the blower and vacuum positions a longitudinal axis of the grip generally lies in an upright plane that passes through a centre of gravity of the device, and the grip is disposed above the centre of gravity, such that the device hangs below the grip in different balanced orientations in the blower and vacuum positions.

Preferably the handle is connected to the body by a pivot having a pivot axis that passes through the centre of gravity.

Preferably the pivot axis is generally perpendicular to, and intersects with, the impeller axis.

Preferably the pivot axis is generally coplanar with the longitudinal axis of the grip.

Preferably the handle is the only handle on the device.

Preferably the handle has longitudinally opposing distal and proximal ends.

Preferably the longitudinal axis of the grip is curved, and a section of the longitudinal axis adjacent the distal end is approximately parallel to the pivot axis.

Preferably the device further comprises a clamp for clamping the proximal end in the blower and vacuum positions.

This invention provides a device which is effective and efficient in operational use, and which has an overall simple design which minimizes manufacturing costs and maximizes performance, by providing improved ergonomic performance that allows safe and comfortable single-handed operation for both blowing and vacuuming.

BRIEF DESCRIPTION OF THE DRAWINGS

Preferred forms of the present invention will now be described by way of example with reference to the accompanying drawings, wherein:

FIG. 1 is a view the device of the present invention in the blower mode;

FIG. 2 is a section through the scroll housing of the device of FIG. 1 perpendicular to the impeller axis;

DETAILED DESCRIPTION

Figure 3:
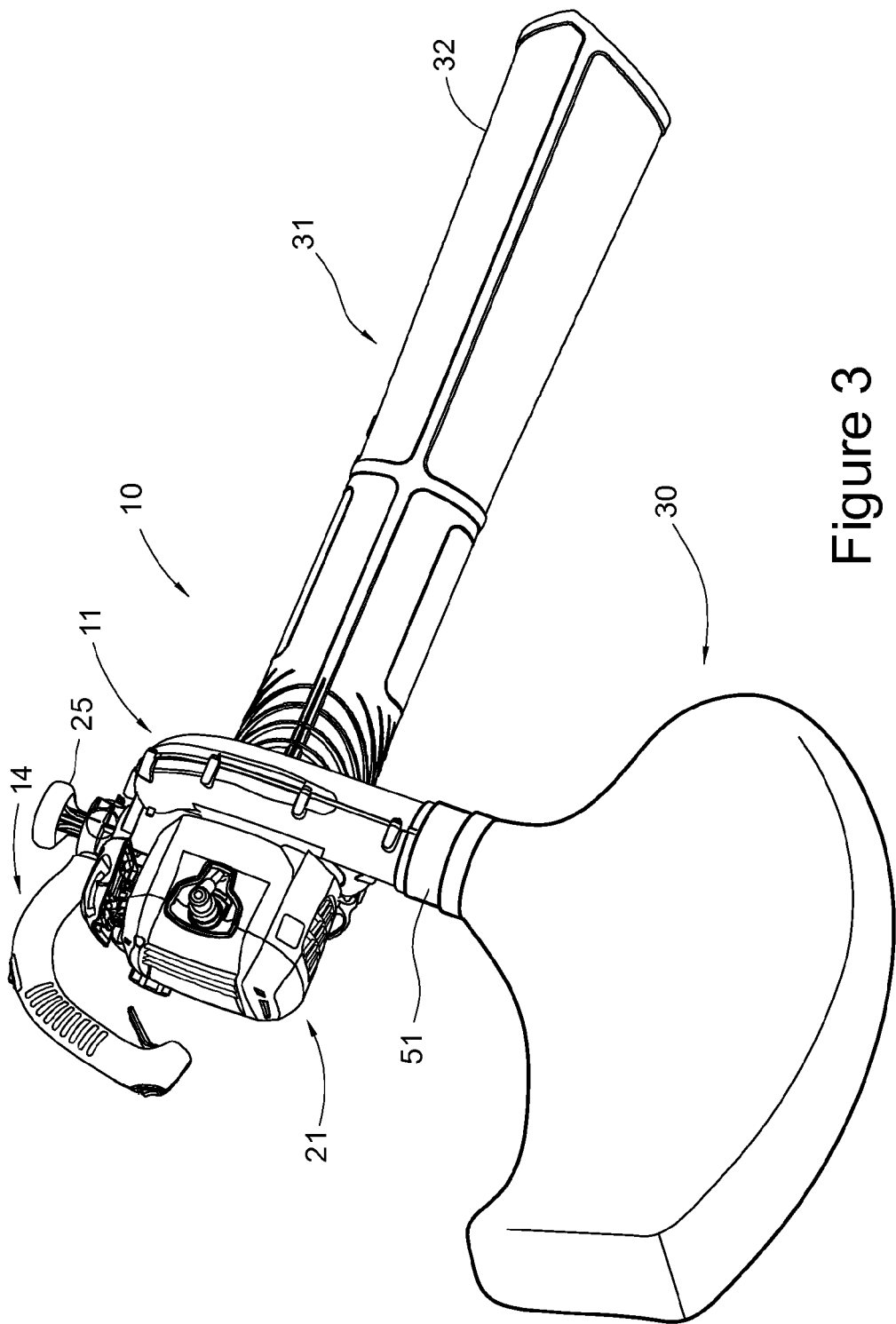
FIG. 3 is a view the device of the device of FIG. 1 in the vacuum mode.

Referring to FIGS. 1 and 2, a hand held blowervac device 10 includes a body 11 that supports an impeller 53 and a motor 21. The body 11 may be an assembly of multiple parts and provides a structural frame for the tool. The body 11 may comprise an impeller scroll housing 11a and motor mounting section 11b. The scroll housing 11a encloses the impeller 53 and has an air inlet 50 aligned with impeller axis 12. An air outlet 51 redirects the generally tangential airflow generally along an outlet air flow axis 52 that may be aligned generally radially. The motor 21 is mounted in the motor mounting section 11b, which may be integral with a shell of the scroll housing 11a. The air outlet 51 may have an elongate blower nozzle 20 mounted thereon, for use in a blower mode. A handle 14 is elongate and includes an elongate grip 16. The handle 14 may have a cantilever-type construction with the grip 16 adjacent its distal end 56. A proximal end 54 the handle 14 is fixed by a pivot 15 to the body 11. The grip 16 may be ovoid in cross-section and have a curved longitudinal axis 17 that generally lies within a handle plane 18 that intersects with a pivot axis 27 of the pivot 15. The pivot axis 27 is thus generally coplanar with the longitudinal axis 17 of the grip 16, and the handle plane 18 bisects the grip longitudinally. The handle 14 and handle plane 18 are illustrated in FIG. 1 in a blower position for use as a blower, but shown in dashed outlines in a vacuum position, about 90° from the blower position.

The pivot 15 may comprise a screw fastener 25 having a head 25a by which it may be gripped. The screw fastener 25 extends through an opening in the proximal end 54, and is received in a complementary screw threaded aperture in the body 11, such that the screw fastener provides a clamp for clamping the proximal end 54 in the blower and vacuum positions. By releasing the screw fastener 25 the handle 14 may be rotated. The blower and vacuum positions may be defined by stops (not shown) that are preferably 90° apart so as to restrain the angular movement. But alternatively the handle 14 could be rotated by 270° between operating positions.

The pivot axis 27 of the pivot 15 may be transverse to the impeller axis 12 and, in particular may be aligned perpendicular to, and intersecting with, the impeller axis 12. The pivot axis 27 may also generally lie in the handle plane 18, in which with the longitudinal axis 17 of the grip 16 lies. Also, as shown in FIGS. 4, 5, 7 and 8, the pivot axis 27 may pass through a centre of gravity 60 of the device located, for instance, at the intersection of the axis 27 and the impeller axis 12.

Figures 4, 5:
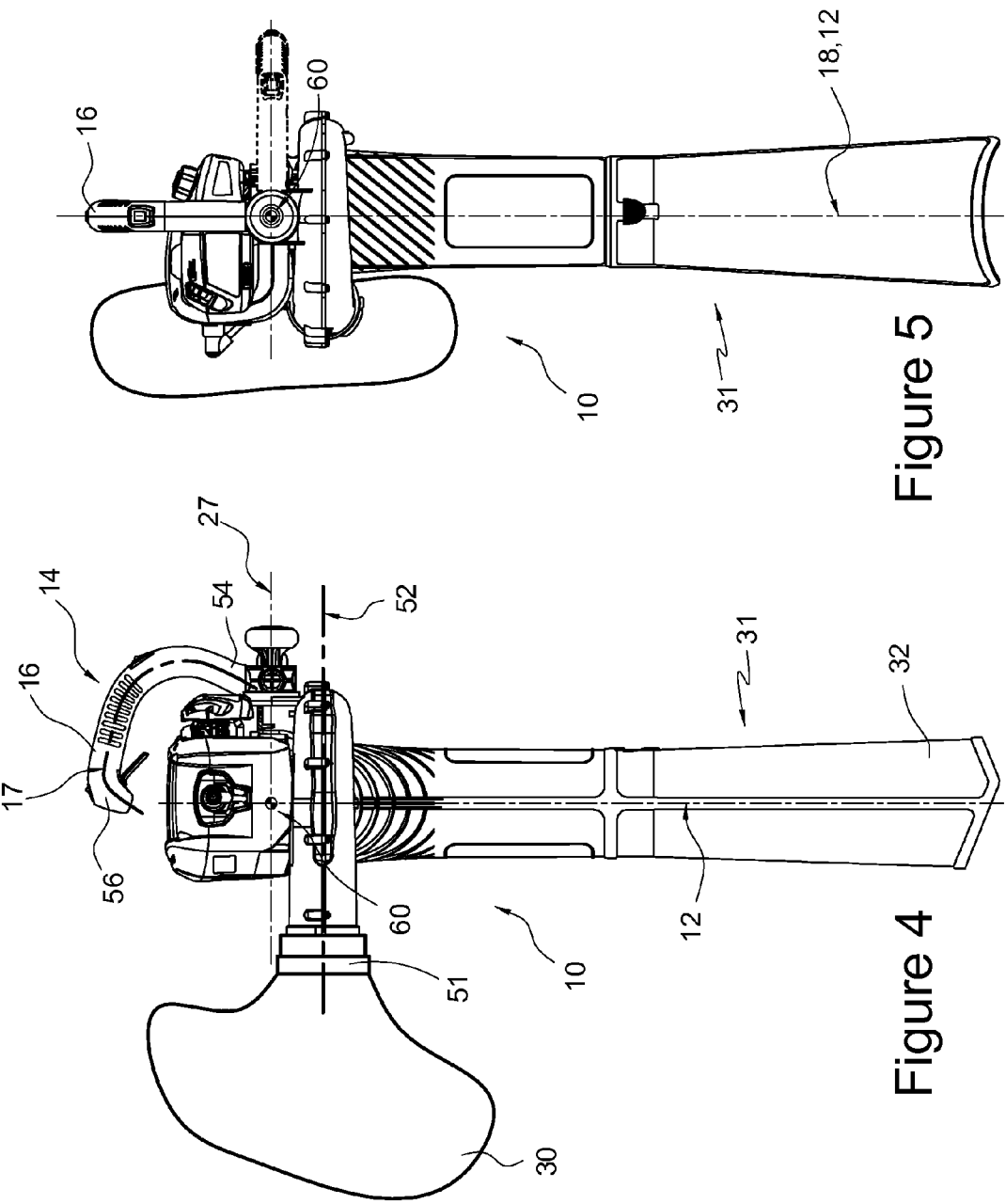
FIGS. 4 and 5 are side and end views, respectively, of the device of FIG. 1 in the vacuum mode.

The vacuum position is further shown in FIGS. 3 to 5, which illustrates the device 10 with a vacuum bag 30 attachable (or attached, as in FIG. 4) to the air inlet 50 and a vacuum nozzle 31 attached. The blower position of the handle 14 is shown in dashed outline in FIGS. 4 and 5. The vacuum nozzle 31 may include a straight portion aligned with the impeller axis 12 and which is connected to the air inlet 50. The vacuum nozzle 31 may taper to reduce in cross section toward an outer end 32, which may be angled to the central axis 58.

Figure 6:
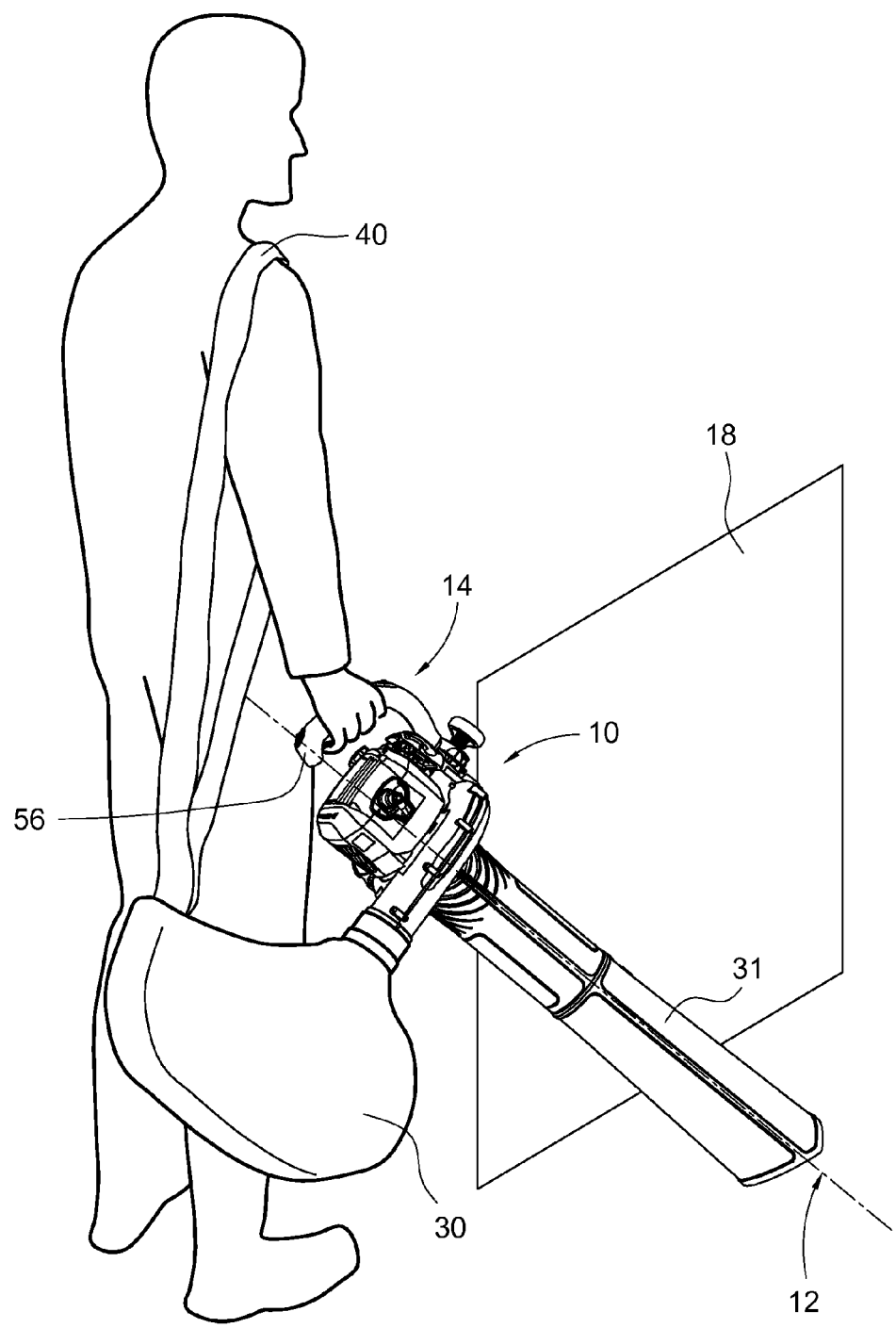
FIG. 6 is a view of a user using the device of FIG. 1 in the vacuum mode.

As best seen in FIGS. 4-6, the handle 14 is turned to and fixed its vacuum position for use in a vacuum mode in which the impeller axis 12 generally lies in the handle plane 18, which is upright, as shown. In this vacuum position, when carried by the grip 16 the centre of gravity 60 of the device 10 is below the grip 16, thus gravity applies a stabilising moment that tends to maintain a balanced orientation in which the centre of gravity 60 lies in the handle plane 18 directly below the grip 16. Owing to the alignment of the handle and grip 16, a user is thus able to hold the blower/vacuum device at his side in this vacuum position, with the grip 16 aligned fore-and-aft, as shown in FIG. 6. The air inlet 50 and the impeller axis 12 are generally inclined at a downward angle, placing the outer end 32 of the vacuum nozzle 31 lowermost. By adjusting a grip position longitudinally along the grip 16 the user can move the centre of gravity 60 fore-and-aft to vary the downward angle of the impeller axis 12 in its stable, balanced position. Held in this way, the user can readily swing the device about a transverse horizontal axis perpendicular to the handle plane 18. On the other hand, the user has little ability to apply a moment about a fore-and-aft horizontal axis in the same sense as the gravity-impelled stabilising moment. This allows the device to be readily used with a single hand. In this vacuum position, the distal end 56 projects forward and the air outlet 51 extends downward to the vacuum bag 30. The vacuum bag 30 is releasably attached to air outlet 51, and may be supported on the user by a shoulder strap 40 fixed to the vacuum bag 30 at a position spaced apart from the air outlet 51. A control switch 41 may be mounted to the handle 14 near the distal end 56, so as to be readily actuable in either blower or vacuum mode.

Figure 7:
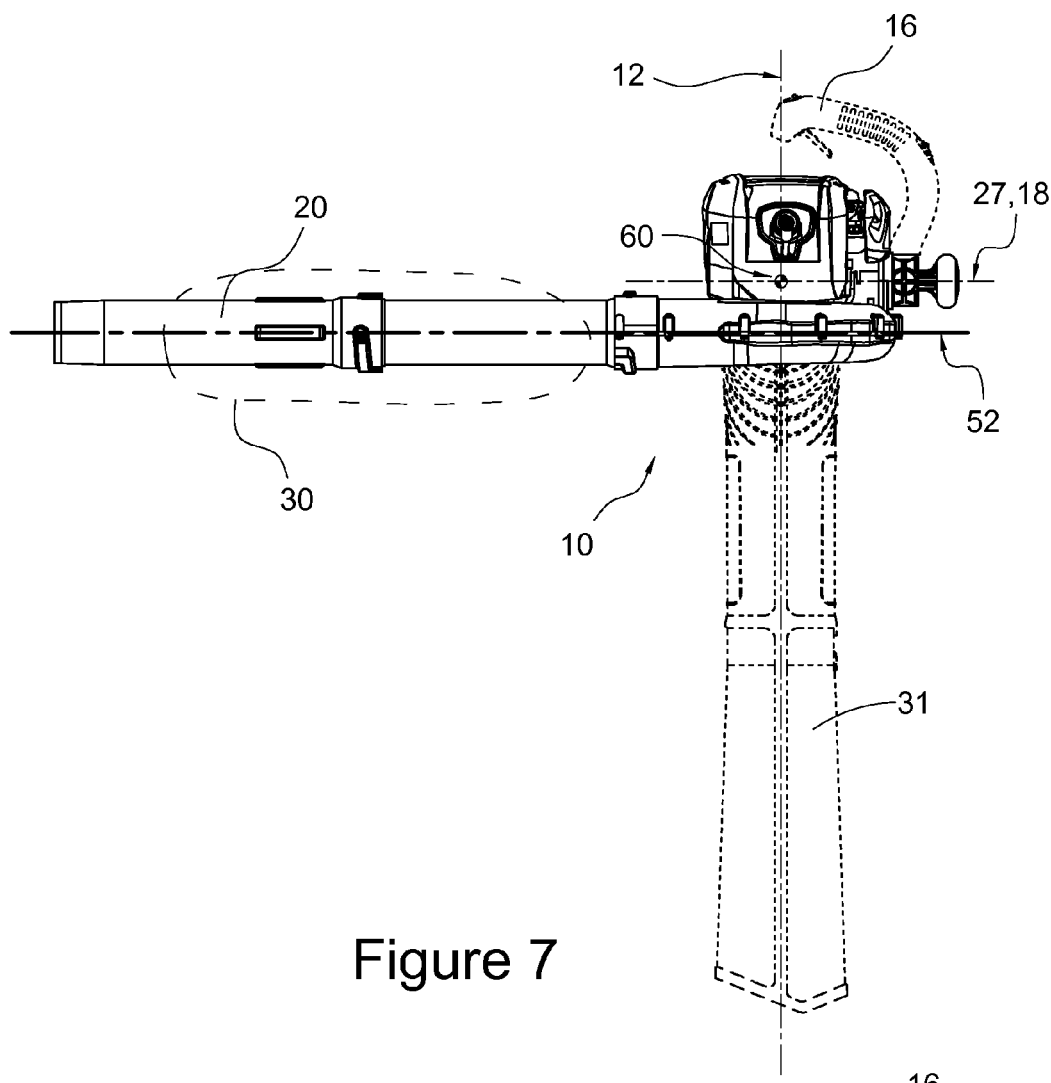
FIGS. 7 and 8 are side and end views, respectively, of the device of FIG. 1 in the vacuum mode.
Figure 8:
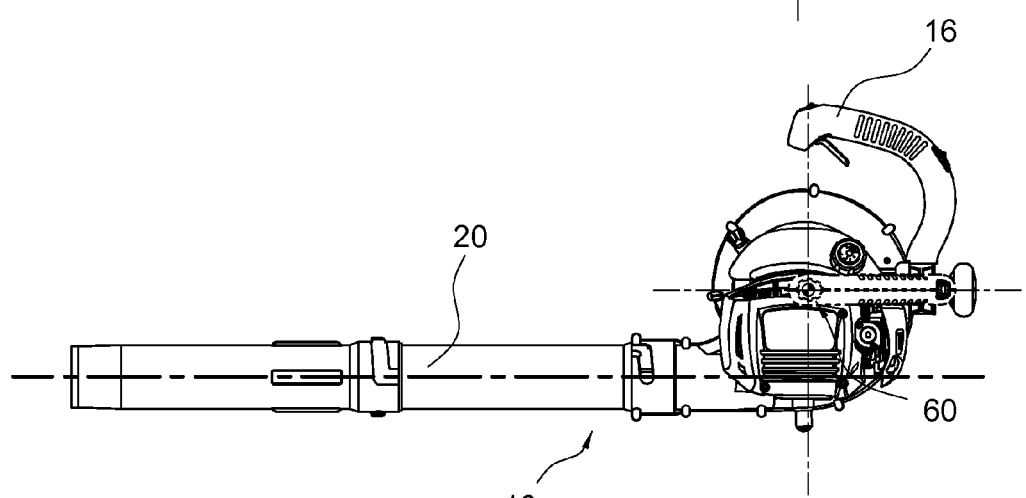
Figure 9:
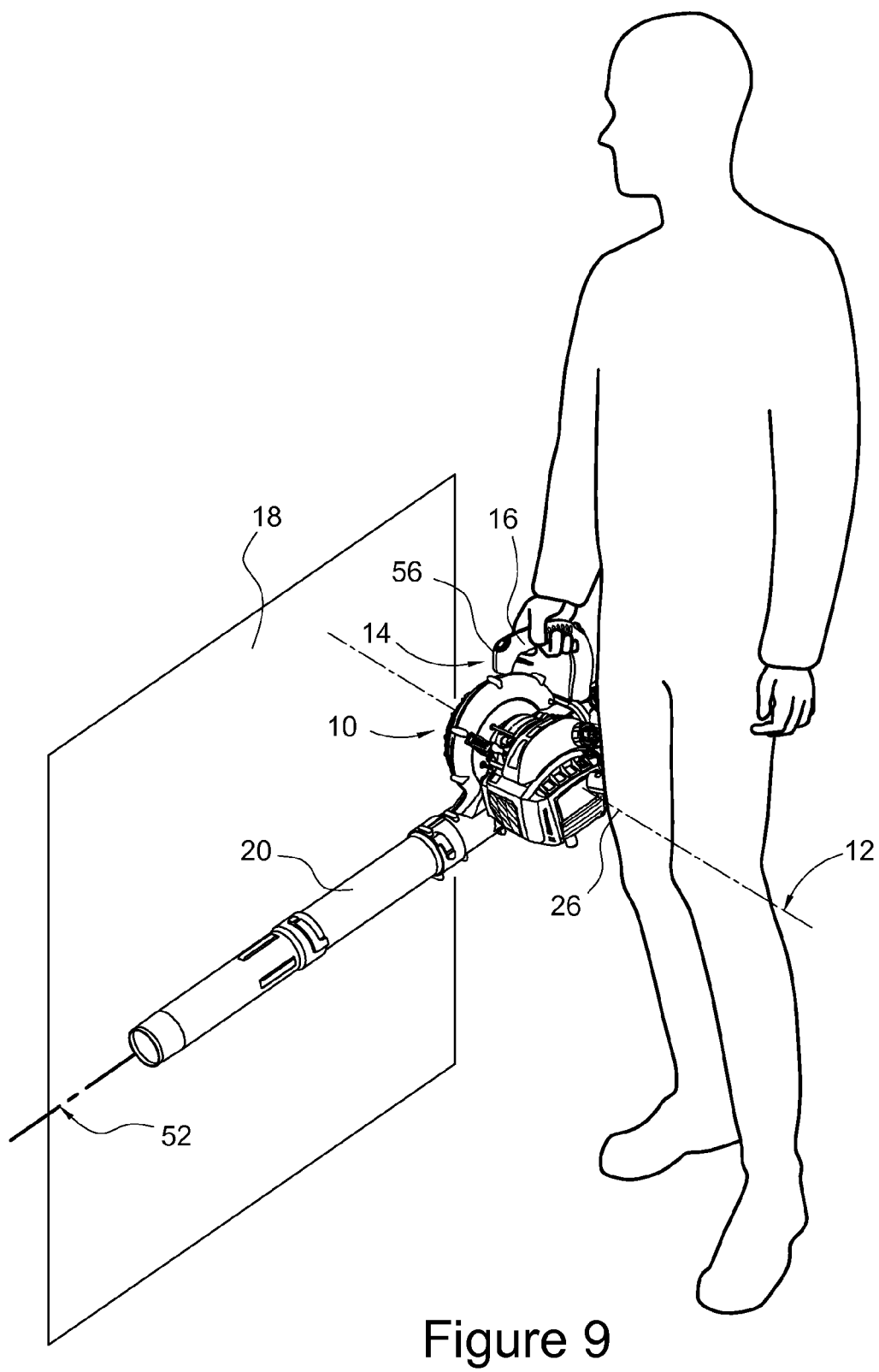
FIG. 9 is a view of a user using the device of FIG. 1 in the blower mode.

The blower position of the handle 14 is shown in FIGS. 7-9, and in dashed outline the vacuum position of the handle 14, as are the vacuum bag 30 and the vacuum nozzle 31. The device is supported in a similar manner to that provided in the vacuum position, in as far as the grip 16 is held in a like orientation with the grip axis 17 extending fore-and-aft in the upright handle plane 18 and the centre of gravity 60 hanging below the grip 16. However, as the drawings show, the rotation of the body 11 places it in a different balanced orientation relative to the handle 14, and the handle is also rotated relative to the user, such that the distal end 56 projects rearward. The inlet and impeller axis 12 of the air inlet 50 is generally horizontal and the air outlet 51 and the outlet air flow axis 52 are generally inclined at a downward angle in the blower position. However, as the grip axis 17 is also aligned in the handle plane 18, the device has like characteristics to the vacuum position, whereby adjusting the grip position longitudinally along the grip 16 allows the downward angle to be varied, and the orientation of the grip 16 provides good purchase for swinging the device about the transverse axis.

Aspects of the present invention have been described by way of example only and it should be appreciated that modifications and additions may be made thereto without departing from the scope thereof.

The invention claimed is:

1. A hand held blower/vacuum device comprising:
an impeller having an impeller axis;
a motor for rotating the impeller;
a body for supporting the motor and impeller, the body including a scroll housing for enclosing the impeller;
an air inlet in the scroll housing that is aligned axially;
an air outlet in the scroll housing, and
a handle having an elongate grip, the handle being rotatably connected to the body to turn between at least two positions, a blower position for operation in a blower mode in which the air inlet is generally horizontal and the air outlet is generally inclined at a downward angle, and a vacuum position for operation in a vacuum mode in which the air inlet is generally inclined at a downward angle, wherein in both of the blower and vacuum positions a longitudinal axis of the grip generally lies in an upright plane that passes through a centre of gravity of the device, and the grip is disposed above the centre of gravity, such that the device hangs below the grip in different balanced orientations in the blower and vacuum positions.

2. The device of claim 1 wherein the handle is connected to the body by a pivot having a pivot axis that passes through the centre of gravity.

3. The device of claim 2 wherein the pivot axis is generally perpendicular to, and intersects with, the impeller axis.

4. The device of claim 3 wherein the pivot axis is generally coplanar with the longitudinal axis of the grip.

5. The device of claim 2 wherein the handle is the only handle on the device.

6. The device of claim 2 wherein the handle has longitudinally opposing distal and proximal ends.

7. The device of claim 6 further comprising a clamp for clamping the proximal end in the blower and vacuum positions.

8. The device of claim 1 wherein the handle is the only handle on the device.

9. The device of claim 8 wherein the handle has longitudinally opposing distal and proximal ends.

10. The device of claim 9 further comprising a clamp for clamping the proximal end in the blower and vacuum positions.

11. The device of claim 1 wherein the handle has longitudinally opposing distal and proximal ends.

12. The device of claim 11 wherein the longitudinal axis of the grip is curved, and a section of the longitudinal axis adjacent the distal end is approximately parallel to the pivot axis.

13. The device of claim 11 further comprising a clamp for clamping the proximal end in the blower and vacuum positions.

* * * * *